(12) United States Patent
Berchtold

(10) Patent No.: US 11,014,177 B2
(45) Date of Patent: May 25, 2021

(54) WHIRLING DEVICE

(71) Applicant: PCM Willen SA, Villeneuve (CH)

(72) Inventor: Stephan Berchtold, Moosseedorf (CH)

(73) Assignee: PCM Willen SA, Villeneuve (CH)

( * ) Notice: Subject to any disclaimer, the term of this patent is extended or adjusted under 35 U.S.C. 154(b) by 35 days.

(21) Appl. No.: 16/202,384

(22) Filed: Nov. 28, 2018

(65) Prior Publication Data

US 2019/0184477 A1    Jun. 20, 2019

(30) Foreign Application Priority Data

Dec. 18, 2017    (CH) .................................... 01546/17

(51) Int. Cl.
*B23C 3/32*    (2006.01)
*B23C 1/12*    (2006.01)
(Continued)

(52) U.S. Cl.
CPC .................. *B23G 1/34* (2013.01); *B23C 1/12* (2013.01); *B23C 3/32* (2013.01); *B23C 5/28* (2013.01);
(Continued)

(58) Field of Classification Search
CPC .. B23G 2240/60; B23G 1/34; B23G 2240/12; B23G 2200/22; B23G 5/005; B23C 2220/68; B23C 2210/503; B23Q 11/1023; B23Q 11/103; B23B 2220/52; Y10T 409/30056; Y10T 409/300056–300784; Y10T 409/304032; Y10T 409/307616
(Continued)

(56) References Cited

U.S. PATENT DOCUMENTS 1,159,790 A    11/1915 Oster
1,566,700 A    12/1925 Schmeklz
(Continued)

FOREIGN PATENT DOCUMENTS

DE           20886        5/1957
DE    102005043790 A1 *  3/2007
(Continued)

OTHER PUBLICATIONS

Machine Translation of DE 102005043790-A1, which DE '790 was published Mar. 2007.*

*Primary Examiner* — Erica E Cadugan
(74) *Attorney, Agent, or Firm* — Muncy, Geissler, Olds & Lowe, P.C.

(57) ABSTRACT

The whirling device comprises a retaining ring extending around a ring axis and a central opening and having at least one receiving area for a machining element for machining rod-shaped material in the area of the central opening. A coolant supply comprises a supply sleeve which is arranged on the retaining ring via a rotary bearing and comprises a coolant connection and a supply area adjoining a connection area of the retaining ring. Starting from at least one inlet opening in the connection area of the retaining ring, at least one passage leads through the retaining ring to at least one outlet opening which faces the central opening of the retaining ring and is designed for a machining element in a receiving area. No space is required for the coolant supply between the retaining ring and an assigned lathe.

7 Claims, 2 Drawing Sheets

Figure 4:
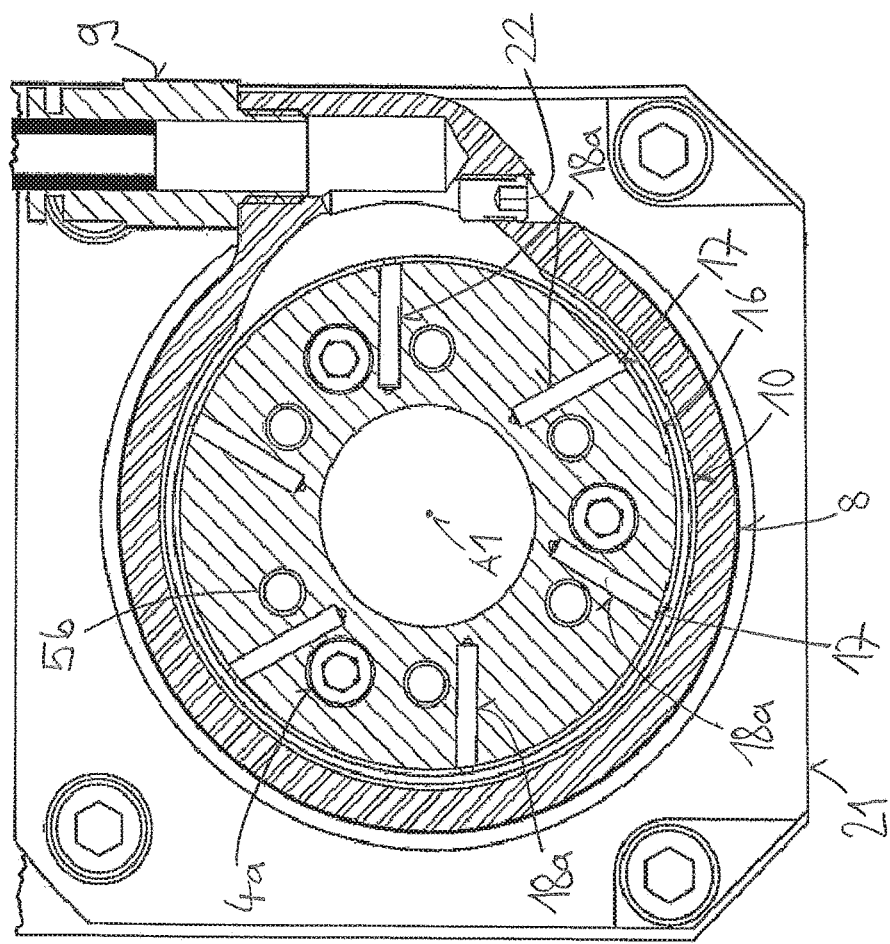

(51) Int. Cl.
- *B23C 5/28* (2006.01)
- *B23Q 11/10* (2006.01)
- *B23G 1/32* (2006.01)
- *B23G 1/52* (2006.01)
- *B23G 1/44* (2006.01)
- *B23G 1/34* (2006.01)
- *B23G 1/22* (2006.01)
- *B23G 5/00* (2006.01)
- *B23G 5/18* (2006.01)
- *B23Q 1/52* (2006.01)

(52) U.S. Cl.
CPC ............... *B23G 1/22* (2013.01); *B23G 5/005* (2013.01); *B23G 5/18* (2013.01); *B23Q 1/525* (2013.01); *B23Q 11/103* (2013.01); *B23Q 11/1023* (2013.01); *B23C 2210/503* (2013.01); *B23C 2220/68* (2013.01); *B23C 2250/12* (2013.01); *B23G 2240/12* (2013.01); *B23G 2240/60* (2013.01); *Y10T 409/30056* (2015.01); *Y10T 409/300672* (2015.01); *Y10T 409/304032* (2015.01); *Y10T 409/307616* (2015.01); *Y10T 409/307672* (2015.01); *Y10T 409/309408* (2015.01)

(58) Field of Classification Search
USPC .................................. 409/65–78, 136, 200
See application file for complete search history.

(56) References Cited

U.S. PATENT DOCUMENTS

| | | | | |
|---|---|---|---|---|
| 1,586,186 | A | | 5/1926 | Erdman |
| 2,131,854 | A | * | 10/1938 | Gremillion ............ B23G 5/005 408/60 |
| 3,176,330 | A | * | 4/1965 | Jennings ................. B23B 27/10 408/57 |
| 4,949,813 | A | | 8/1990 | Kidder et al. |
| 5,290,135 | A | | 3/1994 | Ball |
| 2008/0131224 | A1 | * | 6/2008 | Vouillamoz .............. B23G 1/34 409/74 |
| 2014/0318330 | A1 | * | 10/2014 | Rigolone ................. B23G 1/34 82/118 |
| 2018/0193934 | A1 | * | 7/2018 | Wagner .................... B23G 5/18 |

FOREIGN PATENT DOCUMENTS

| | | | |
|---|---|---|---|
| DE | 102017130056 | A1 * | 6/2019 |
| EP | 1 902 804 | A2 | 3/2008 |
| WO | 2013038028 | A1 | 3/2013 |
| WO | 2017042061 | A1 | 3/2017 |

\* cited by examiner

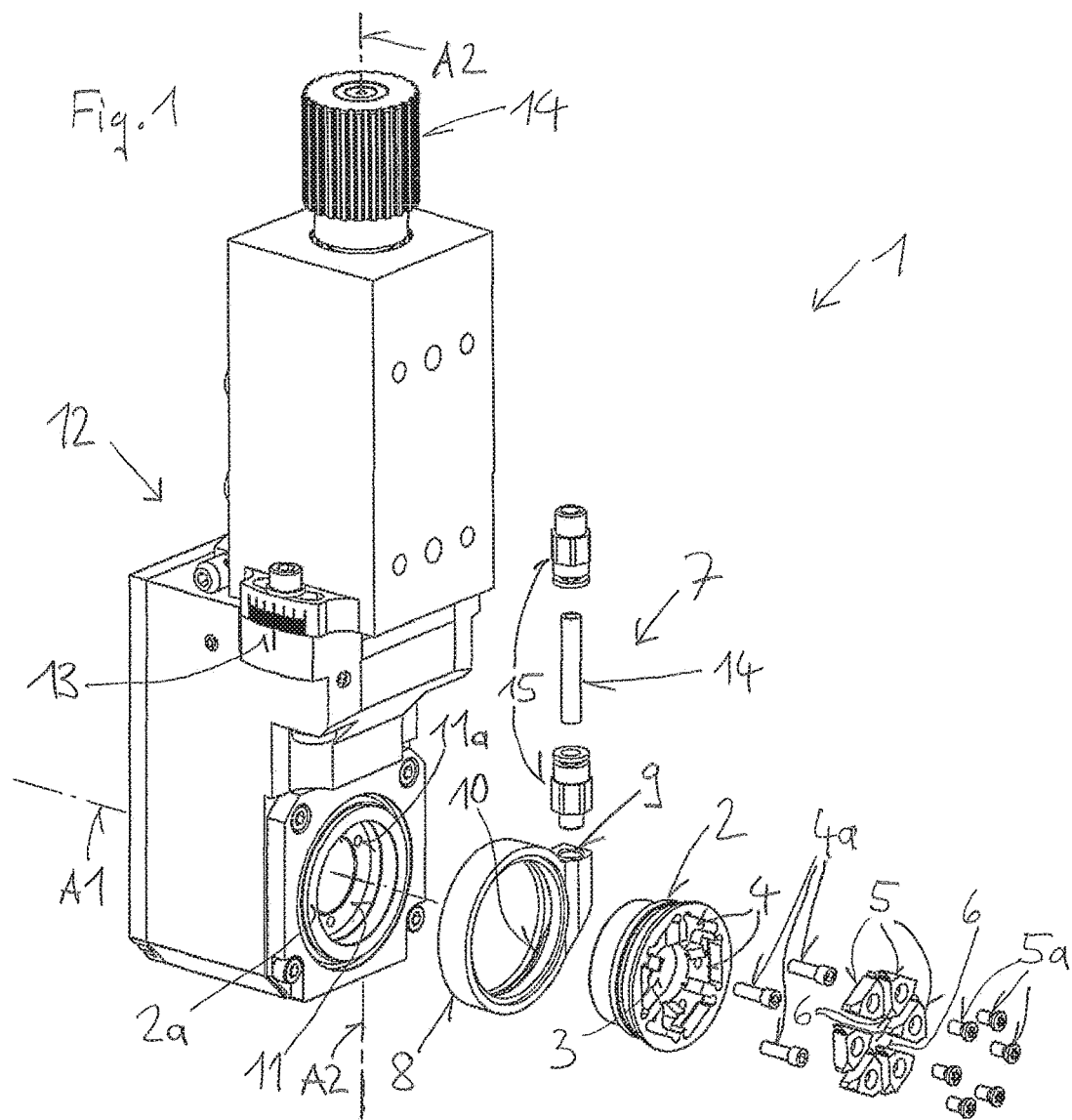

WHIRLING DEVICE

This application claims priority of Application No. CH 01546/17 filed in Switzerland on Dec. 18, 2017, which is herein incorporated by reference in its entirety.

The invention refers to whirling devices. Whirling devices are used for machining rod-shaped material, in particular for forming threads.

Common whirling devices are referred to generally as thread whirling devices and comprise at least one annular holder on which machining elements, in particular cutting plates, are to be fastened in such a way that they can machine rod-shaped material in the area of the central opening in the annular holder. WO 2017/042061 A1 and EP 1 902 804 A2 show examples of such annular holders which can be described as retaining rings.

WO 2013/038028 A1 shows a thread whirling device in which the retaining ring is fastened to a spindle sleeve, wherein the spindle sleeve is mounted on a support device so that it can rotate about a first axis. The support device is designed so that the spindle sleeve can be pivoted about a second axis, wherein the two axes are aligned substantially perpendicular to each other. The support device can be attached to a lathe in such a way that rod-shaped material set in rotation by the lathe can be processed by machining elements attached to the retaining ring. The machining process generates chips and heat, which must be removed. For this purpose, as shown in DD 20886 for example, coolant is injected from the side of the retaining ring facing away from the spindle sleeve via a coolant supply in the form of a supply line with the open end directed towards the area with the machining tools against the machining area or against the central opening of the retaining ring. Space is required between the ring-shaped carrier and the lathe for the supply line. The rod-shaped material must protrude accordingly far beyond the lathe, which during machining can lead to undesired vibrations of the rod-shaped material in the area of the machining elements.

It is now the object of the invention to find a whirling device in which cooling can be achieved without taking up too much interfering space.

The object is achieved by the features of this whirling device. Alternative or advantageous embodiment variants may achieve further objects.

The whirling device according to the invention comprises a retaining ring extending around a ring axis and a central opening, having at least one receiving area for a machining element with an engaging area for machining rod-shaped material in the area of the central opening. A coolant supply comprises a supply sleeve which is arranged on the retaining ring via a rotary bearing and comprises a coolant connection as well as a supply area adjoining a connection area of the retaining ring. Starting from at least one inlet opening in the connection area of the retaining ring, at least one passage through the retaining ring leads to at least one outlet opening which faces the central opening of the retaining ring and is formed in a receiving area for a machining element.

No space is required for the coolant supply between the retaining ring and an assigned lathe. Accordingly, the rod-shaped material only has to protrude minimally beyond the lathe, which essentially excludes disturbing vibrations of the rod-shaped material during machining. Because the at least one outlet opening from which the coolant emerges is located directly at the central opening of the retaining ring and thus very close to the engagement area to be cooled, the coolant can be used extremely efficiently.

The supply sleeve arranged on the retaining ring ensures that the coolant passes from the coolant connection to the supply area and from this to the connection area of the retaining ring.

According to a preferred embodiment, the supply sleeve extends radially outwards in the direction of the ring axis over a section of the retaining ring. Preferably, the supply sleeve is positioned on the retaining ring in the direction of the ring axis in that first position surfaces extending in the radial direction to the ring axis at both ends of the supply sleeve adjoin second position surfaces in the axial direction, which surfaces project radially forward or backward on the retaining ring.

In order to bring the position surfaces into the position required for positioning, the supply sleeve or the retaining ring can be designed in two parts. The two-part element is then arranged from two opposite sides on the other element and with one connection the two parts of the two-part element are kept in mutual contact. When the supply sleeve is positioned between two position surfaces of the retaining ring, the retaining ring shall preferably include an end ring which, after being placed on a region of the retaining ring, adjoins the supply sleeve such that the supply sleeve is held on the retaining ring.

In preferred embodiments, the connection area of the retaining ring is formed on a radially outwardly directed ring surface. The supply area of the coolant supply, which can be connected to the connection area of the retaining ring facing outwards, adjoins the connection area radially outwards. If the coolant now passes under pressure from the supply area to the connection area, essentially no forces with components in the direction of the ring axis arise between the coolant supply and the retaining ring.

The forces generated by the coolant pressure between the coolant supply and the retaining ring are aligned essentially perpendicular to the ring axis. Resulting radial forces, which would press areas of the retaining ring and the coolant supply against each other, are avoided in preferred designs in that the connection area of the retaining ring and the supply area of the coolant supply which can be connected thereto extend annularly closed around the ring axis and are designed in such a way that the resulting forces are formed essentially point symmetrical with respect to the ring axis. The coolant supplied under pressure forms a floatingly mounted ring area between the connection area of the retaining ring and the adjoining supply area of the coolant supply, which also enables high rotational speeds between the supply sleeve and the retaining ring without disturbing wear.

In a particularly preferred embodiment, the annular surface of the connection area is formed on the outer surface of at least one cylindrical section of the retaining ring. The transition of the coolant from the supply area to the at least one inlet opening to a passage through the retaining ring is improved in that an annular groove is formed in the annular surface of the connection area, wherein the at least one inlet opening is arranged in this groove. Preferably, a groove is also formed in the supply area which directly adjoins the groove of the connection area, so that coolant enters all inlet openings in these two grooves distributed around the ring axis.

Since during the machining of rod-shaped material in the area of the central opening of the retaining ring only part of the machining elements are in engagement with their engagement areas with the material to be machined, the coolant is required above all for these machining elements. In order to reduce the necessary supply of cooling liquid, the supply area can preferably be reduced to a circumferential area with machining elements in engagement with the machined material.

To ensure that the described fluid bearing arrangement is formed mirror symmetrical to the ring axis, it is advisable to form the supply area also with a circumferential area which is remote from the circumferential area with machining elements in engagement with the machined material. If the required coolant supply is to be kept particularly small, at least one coolant bearing formed by at least one groove and axially offset from the inlet openings can be provided for the bearing. This ensures that coolant is only used for bearing and for the working machining elements.

The above-mentioned positioning of the supply sleeve in the axial direction on the retaining ring comprises first position surfaces extending in the radial direction to the ring axis at both ends of the supply sleeve, which adjoin second position surfaces projecting radially forward or backward on the retaining ring. These mutually adjacent position surfaces also close off the ring area extending in the direction of the ring axis between the connection area and the supply sleeve, i.e. the area in which the coolant is located.

The centered positioning of the supply sleeve on the retaining ring is thus also ensured by the pressure of the coolant. In addition, the position surfaces reduce the escape of coolant. It has been shown that no seals are necessary for a sufficiently small leakage loss of coolant. The omission of seals allows a higher speed, because the resulting heat cannot lead to the destruction of seals.

Preferably, at least part of the surfaces of the retaining ring and the supply sleeve facing each other shall be coated so as to prevent corrosion even in the absence of coolant. The coolant ensures a floating bearing and also cools the counter-rotating areas of the retaining ring and the supply sleeve.

The at least one passage, which originates in the connection area of the retaining ring from the at least one inlet opening, to the at least one outlet opening at the central opening of the retaining ring comprises a first section, the longitudinal axis of which preferably runs at a distance from the ring axis. If the retaining ring rotates in such a way that the inlet opening precedes the first section, the coolant is accelerated by the wall of the first section in such a way that, in addition to the centrifugal force, a small acceleration component must also be observed radially inwards. The radial inward acceleration component reduces the effect of centrifugal force and thus also the supply pressure required to move the coolant from the inlet opening through the rotating retaining ring inward to the outlet opening at the central opening in the retaining ring.

The at least one passage is preferably aligned differently in a second section at the outlet opening than in the first section. The alignment in the second section is selected so that the coolant, after leaving the outlet opening, reaches the engagement area of a machining element, where it ensures the desired cooling effect and the flushing away of the material removed from the rod-shaped material.

The retaining ring with coolant supply which is rotatably arranged thereon relative thereto can be designed in such a way that it can be used in the known devices. Common whirling devices or whirling rings without cooling can be replaced by whirling devices according to the invention. In addition to the coolant supply in the form of a supply sleeve which only takes up some space in the radial direction of the retaining ring, the solution according to the invention also includes an easily accessible retaining ring. Said ring can be designed in such a way that it allows the usual connection possibilities to the spindle sleeve. After changing to a retaining ring with integrated cooling, machining can be carried out at higher speeds because the heat and any abraded chips are removed much better.

A preferred whirling device which can be mounted directly on a lathe additionally comprises a spindle sleeve and a support device, wherein the support ring is attachable to the spindle sleeve, the spindle sleeve is rotatably mounted on the support device about the ring axis, the support device is configured such that the spindle sleeve is drivable about the ring axis and pivotable about an adjustment axis, wherein the ring axis and the adjustment axis are aligned substantially perpendicular to each other. The adjustable pivoting alignment around the adjustment axis determines the angle at which a central plane of the retaining ring is aligned to the supplied rod-shaped material. The support device preferably comprises a rotary transmission which transmits a rotary movement from the drive side to the spindle sleeve.

The rotary transmission comprises, for example, a first shaft originating from the drive side and extending parallel to the adjustment axis and rotatably mounted in the support device. When the axis of the first shaft lies on the adjustment axis, the alignment of the ring axis can be changed without affecting the mounting and driving of the first shaft. The retaining ring is also essentially located in an area through the center of which the adjustment axis passes. For this reason, the retaining ring remains essentially in the same position even when the alignment of the ring axis is changed. The drive transmission from the first shaft to the spindle sleeve is preferably carried out via a second shaft, which is rotatably mounted in the support device and aligned perpendicular to the first shaft, wherein the two shafts with two intermeshing bevel gears ensure the rotary transmission. A gear wheel arranged on the second shaft can transmit the rotary motion to the spindle sleeve via a gear wheel arranged on the spindle sleeve.

The coolant is supplied to the coolant connection of the coolant supply preferably via a connection on the support device. This ensures that the whirling device according to the invention can be easily mounted on existing support devices where coolant was previously sprayed through an open-ended line against the machining tool area. The coolant lines or connections include quick-change connections which can also be used at high pressure, for example at 150 bar.

Figure 3:
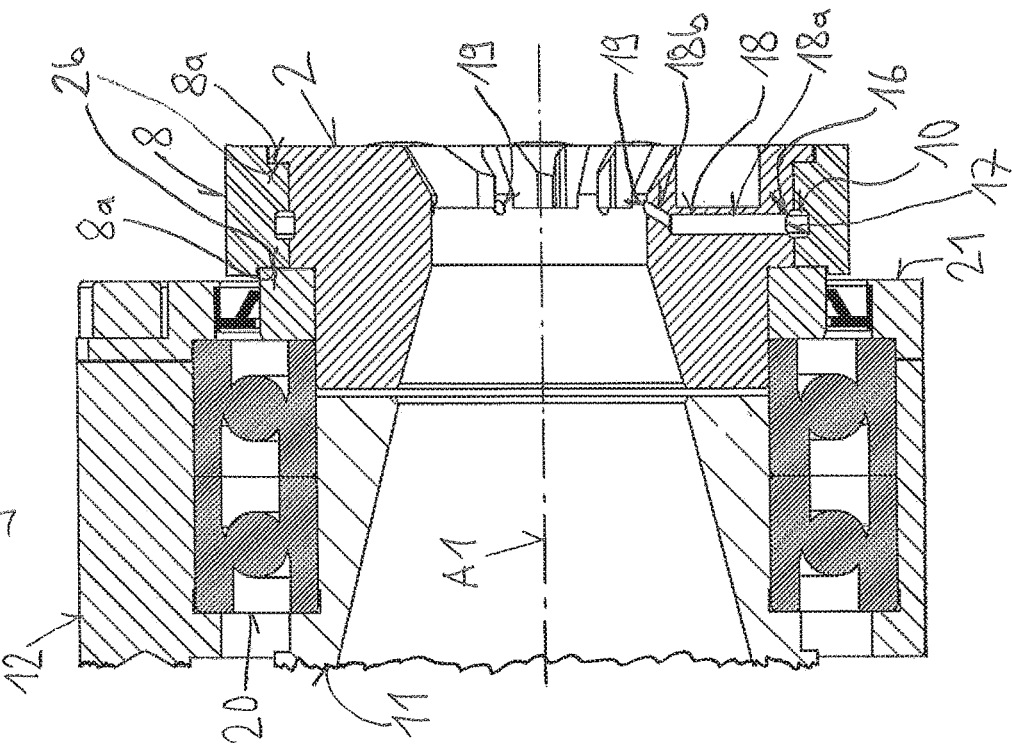

The drawings explain the invention using an exemplary embodiment, to which it is not restricted, wherein:

FIG. 1 shows a perspective exploded view of a whirling device with support device, FIG. 2 shows a perspective representation of a supply sleeve and a retaining ring, FIG. 3 shows a section of a longitudinal section through a supported spindle sleeve and a retaining ring with supply sleeve, and FIG. 4 shows a cross-section through a retaining ring with supply sleeve.

FIG. 1 shows a whirling device 1 which can be mounted directly on a lathe. It comprises a retaining ring 2 extending around a ring axis A1 and a central opening 3. On the retaining ring 2, there are receiving areas 4 for machining elements 5. The machining elements 5 comprise engagement areas 6 with which rod-shaped material can be machined in the area of the central opening 3. The machining elements 5 are fastened to the retaining ring 2 with the fastening screws 5a, for which purpose thread 5b is formed in the retaining ring 2. A coolant supply 7 comprises a supply sleeve 8 with a coolant connection 9 and a supply area 10. The supply sleeve 8 is arranged via a rotary bearing on the retaining ring 2.

The retaining ring 2 is attached to a spindle sleeve 11 with the supply sleeve 8 attached. For example, one fastening consists of three connecting screws 4a, which are screwed into threads 11a of the spindle sleeve 11. In the illustrated embodiment, the retaining ring 2 comprises an end ring 2a, which closes off the area of the retaining ring 2 with the supply sleeve 8 in such a way that the supply sleeve 8 is held in the desired position on the retaining ring 2. The end ring 2a is clamped by the connecting screws 4a between the retaining ring 2 and the spindle sleeve 11. It would also be possible for the end face of the spindle sleeve to assume the function of the end ring 2a.

The spindle sleeve is mounted on a support device 12 so that it can rotate about the ring axis A1. The support device 12 is designed so that the spindle sleeve 11 can be driven around the ring axis A1 and pivoted around an adjustment axis A2, wherein the ring axis A1 and the adjustment axis A2 are aligned essentially perpendicular to each other. The angle at which a central plane of the retaining ring 2 is aligned with respect to the longitudinal axis of the supplied rod-shaped material is determined by the pivot orientation about the adjustment axis A2 which can be adjusted on an adjustment device 13.

The support device 12 preferably comprises a rotary transmission which transmits a rotary movement from the drive side 14 to the spindle sleeve 11. The rotary transmission comprises, for example, a first shaft extending parallel to the adjustment axis A2 from the drive side 14 and rotatably mounted in the support device 12. Because the axis of the first shaft and also the retaining ring 2 lies essentially on the adjustment axis A2, the alignment of the ring axis A1 can be changed and the retaining ring 2 remains essentially in the same place in a different alignment. The drive transmission from the first shaft to the spindle sleeve 11 is preferably effected via a second shaft which is rotatably mounted in the support device 12 and which is aligned perpendicular to the first shaft, wherein the two shafts ensure the rotary transmission with two intermeshing bevel gears. A gear wheel arranged on the second shaft can transmit the rotary motion to the spindle sleeve 11 via a gear wheel arranged on the spindle sleeve.

The coolant is supplied to the coolant connection 9 of the coolant supply 7 preferably via a connection on the support device 12. A coolant line 14 with quick-change connections 15 is inserted for this purpose between the coolant connection 9 and a connection on the support device 12 which is not shown.

FIG. 2 clearly shows the details of the retaining ring 2 and the supply sleeve 8. The inner side of the supply sleeve 8 facing the ring axis A1 is adapted to the outer side of the retaining ring 2 facing away from the ring axis A1 in such a way that a rotary bearing is formed between these two parts. A connection area 16 is formed on a radially outwardly directed annular surface of the retaining ring 2, in which inlet openings 17 are arranged for passages 18 (see FIG. 3) through the retaining ring 2. The passages 18 lead to outlet openings 19, which face the central opening 3 of the retaining ring 2 and are arranged for machining elements in the receiving areas 4.

FIG. 3 shows the retaining ring 2 with the supply sleeve 8 after attachment to the spindle sleeve 11. The supply sleeve 8 extends radially outwards in the direction of the ring axis A1 over a section of the retaining ring 2. The supply sleeve 8 is positioned in the direction of the ring axis A1 on the retaining ring 2 in that at both end faces of the supply sleeve 8 first position surfaces 8a extending in the radial direction to the ring axis adjoin radially projecting second position surfaces 2b in the axial direction, which second surfaces are formed on the retaining ring 2. One of the two second position surfaces 2b is formed on the end ring 2a, which closes off the area of the retaining ring 2 with the supply sleeve 8 in such a way that the supply sleeve 8 is held in the desired position on the retaining ring 2. In addition, the position surfaces 8a and 2b reduce the escape of coolant. In the illustrated embodiment, the end ring 2a is clamped between the retaining ring 2 and a pivot bearing 20 or the side of the pivot bearing 20 fastened to the spindle sleeve 11. The pivot bearing 20 is held by a plate 21 on the support device 12. It is understood that the end ring 2a can also be attached directly to the retaining ring 2 as part of it.

The supply area 10 of the supply sleeve 8 radially externally adjoins the outwardly directed connection area 16 of the retaining ring 2. If the coolant now passes under pressure from the supply area 10 to the connection area 16, essentially no forces with components in the direction of the ring axis A1 arise between the supply sleeve 8 and the retaining ring 2. The resulting forces are aligned essentially perpendicular to the ring axis A1. Resulting radial forces, which would press areas of the retaining ring 2 and the coolant supply 7 against each other, are avoided in that the connection area 16 and the supply area 10 extend annularly closed around the ring axis A1. The coolant supplied under pressure forms a floating bearing starting from the connection area 16 and from the supply area 10, which also enables high rotational speeds between the supply sleeve 8 and the retaining ring 2 without disturbing wear.

The connection area 16 is designed as a groove on the outer surface of a cylindrical section of the retaining ring 2. The inlet openings 17 are arranged in this groove. The supply area 10 is also designed as a groove, which directly adjoins the groove of the connection area 16, so that coolant from the coolant connection 9 reaches all inlet openings 17 via these two grooves.

Since during the machining of rod-shaped material in the area of the central opening 3 of the retaining ring 2 only a part of the machining elements 5 are in engagement with the material to be machined with their engagement areas 6, the coolant is required above all for these machining elements. In order to reduce the necessary supply of cooling liquid, the groove of the supply area 10 can be reduced to a circumferential area with machining elements in engagement with the machined material in a special embodiment. In addition, there is no groove in the connection area 16, so that only the inlet openings 17 in the area of the groove in the supply area 10 are supplied with sufficient feed liquid. In order for the resulting fluid bearing to be formed mirror-symmetrically to the ring axis A1, it is advisable to form a further groove section of the supply area 10 opposite the first groove section, preferably offset in the direction of the ring axis A1 in such a way that the further groove section is offset from the inlet openings 17. If necessary, however, an additional annular groove is used for bearing.

In the connection area 16 of the retaining ring 2, the passages 18 leading from the inlet openings 17 to the outlet openings 19 comprise a first section 18a in accordance with FIG. 4, the longitudinal axis of which preferably runs at a distance from the ring axis A1. If the retaining ring 2 rotates in such a way that the inlet opening 17 precedes the first section 18a, the coolant is accelerated by the wall of the first section 18a in such a way that, in addition to the centrifugal force, a small acceleration component must also be observed radially inwards. The radial inward acceleration component reduces the effect of centrifugal force and thus the feed pressure required to convey the coolant from an inlet opening 17 through the rotating retaining ring 2 inwards to the corresponding outlet opening 19. If necessary, a connection opening 22 is formed in the supply sleeve 8 to which, for example, a pressure sensor, a pressure relief valve or a coolant outlet can be connected. If the connection opening 22 is not required, it can be closed with a screw as shown.

The passages 18 are aligned differently in a second section 18b at the outlet openings 19 than in the first section 18a. The orientation in the second section 18b is selected in such a way that the coolant reaches the engagement area of a machining element after leaving the outlet opening 19.

The invention claimed is:

1. A whirling device including a retaining ring and a coolant supply,
    wherein the retaining ring extends around a ring axis and around a central opening,
    wherein the retaining ring comprises a connection area for the coolant supply and comprises at least one receiving area receiving a respective machining element,
    wherein each machining element includes a respective engagement area for machining rod-shaped material,
    wherein the machining occurs in an area of the central opening,
    wherein the coolant supply comprises a supply sleeve, which is arranged on the retaining ring via a rotary bearing and comprises a coolant connection and a supply area,
    wherein the supply area is adjoining the connection area of the retaining ring,
    wherein at least one passage through the retaining ring starts from at least one inlet opening in the connection area of the retaining ring and leads to at least one outlet opening in a surface of the retaining ring,
    wherein the at least one outlet opening is located in the central opening of the retaining ring and in the at least one receiving area,
    wherein the supply sleeve extends in a direction of the ring axis over a section of the retaining ring, wherein in the section of the retaining ring, the supply sleeve is located radially outwards from the retaining ring,
    wherein the supply sleeve has two face ends and is positioned in a direction of the ring axis on the retaining ring in that first position surfaces extending radially to the ring axis at both face ends of the supply sleeve adjoin, in the direction of the ring axis, second position surfaces, and
    wherein the connection area of the retaining ring is formed on an annular radially-outer surface of the retaining ring and comprises an annular groove.

2. The whirling device according to claim 1, wherein the annular surface of the connection area is formed on the outer surface of at least one cylindrical section of the retaining ring.

3. The whirling device according to claim 2, wherein the annular groove is formed in the annular surface of the connection area and the at least one inlet opening is arranged in this groove.

4. The whirling device according to claim 1, wherein the supply area of the supply sleeve comprises a groove which is in fluid communication with the at least one inlet opening of the retaining ring.

5. The whirling device according to claim 1, wherein the at least one passage, starting from the at least one inlet opening, comprises a first section with a first longitudinal axis extending at a distance from the ring axis.

6. The whirling device according to claim 5, wherein the at least one passage comprises a second section at the at least one outlet opening, wherein the second section extends along a second longitudinal axis and the first longitudinal axis and the second longitudinal axis are aligned differently.

7. The whirling device according to claim 1, wherein the whirling device comprises a spindle sleeve and a support device, wherein the retaining ring is fastenable to the spindle sleeve, the spindle sleeve is mounted on the support device so as to be rotatable about the ring axis, the support device is formed such that the spindle sleeve is drivable about the ring axis and pivotable about an adjustment axis, wherein the ring axis and the adjustment axis are aligned substantially perpendicular to each other.

* * * * *